United States Patent [19]

Abegg, III et al.

[11] Patent Number: 4,881,184

[45] Date of Patent: Nov. 14, 1989

[54] TURBINE MONITORING APPARATUS

[75] Inventors: Frank Abegg, III; Stephen G. Gemmell, both of Fairbanks, Ak.

[73] Assignee: Datac, Inc., Fairbanks, Ak.

[21] Appl. No.: 94,563

[22] Filed: Sep. 8, 1987

[51] Int. Cl.$^4$ .............................................. G01L 25/00
[52] U.S. Cl. ................................. 364/551.01; 73/116; 290/40 R; 364/494; 364/550
[58] Field of Search ............. 73/116; 290/40 R, 40 C; 346/33 TP; 364/431.02, 492, 494, 550, 551, 551.01

[56] References Cited

U.S. PATENT DOCUMENTS

| | | | |
|---|---|---|---|
| 3,937,934 | 2/1976 | Pasemann | 290/40 R X |
| 3,983,375 | 9/1976 | Johnson | 73/116 X |
| 4,074,357 | 2/1978 | Gupta et al. | 364/494 |
| 4,280,060 | 7/1981 | Kure-Jensen et al. | 364/494 X |
| 4,575,803 | 3/1986 | Moore | 364/550 X |
| 4,602,341 | 7/1986 | Gordon et al. | 290/40 R X |
| 4,621,335 | 11/1986 | Bluish et al. | 364/550 |
| 4,649,878 | 3/1987 | Otobe et al. | 290/40 R X |
| 4,687,946 | 8/1987 | Jones | 290/40 R |
| 4,788,956 | 12/1988 | Suzuki et al. | 73/116 X |

OTHER PUBLICATIONS

Newark Catalog, pp. 920–921.
Allied Catalog, pp. 605 & 643.
Brochure–General Electric, *Speedtronic Control Calibrator.*
Brochure–Hawker Siddeley, *Dynatrend 1 & 2 Condition Monitoring.*
Brochure–DATM4, *Diagonostic Analysis of Turbo-Machinery.*

Primary Examiner—Parshotam S. Lall
Assistant Examiner—Edward R. Cosimano
Attorney, Agent, or Firm—Seed and Berry

[57] ABSTRACT

A turbine monitoring device is provided for interfacing the control panel of a gas turbine with a standard personal computer. The interface device includes a plurality of isolation circuits for isolating the personal computer from the turbine control panel to prevent ground faults. The interface device also includes scaling circuits to allow a selectable scaling factor to be provided to prefetermined operating signals. The interface device is adapted to receive operating signals from the control panel of the turbine and convert the operating signals into data signals which are suitable for use by the data processor. The interface device of the present invention may be used in conjunction with a variety of data processors which are readily available.

8 Claims, 3 Drawing Sheets

TURBINE MONITORING APPARATUS

1. Technical Field

The present invention is directed toward gas turbines and, more particularly, is directed toward method and apparatus for monitoring the operating status of a gas turbine with an electronic control system.

2. Background of the Invention

The gas turbine has become the industrial workhorse throughout the world. Its reliability and efficient operation depends heavily on predictive maintenance. The turbine's electronic control system calibration is critical to the unit's safe operation and for extending the life of its expensive combustion section. Faulty fuel system controls can quickly destroy combustion liners, nozzles and turbine buckets during one brief startup cycle.

To assure the necessary predictive maintenance, it is necessary to provide an operation monitoring system which provides accurate operational data in a form which is readily usable by the turbine maintenance staff. Prior art systems for providing turbine data acquisition were primarily limited to chart recorders and data loggers.

Chart recorders generally give relative graphs of various operational parameters. However, interfacing the chart recorders with the turbine often requires hard wiring of various components, thus making the setup procedure difficult and time consuming. Further, reading and comparing the graphs and other data provided by chart recorders is difficult and tedious.

Data loggers are units which generally provide simple numerical printout of operating parameters. Due to the numerical nature of the data logger output, analysis of the data is difficult and labor intensive. Further, data loggers, like chart recorders, must be hard wired to the turbine requiring significant time and labor to initialize the recording system.

More modern data acquisition systems include processing elements for operating on the acquired data and providing more meaningful output. Many such data acquisition systems, however, are expensive and require dedicated processors thus precluding the processor from performing non-data acquisition related tasks and, thereby, limiting the benefit of the acquisition system and consequently reducing the return on the system investment. Further, in addition to requiring a data processor which is dedicated to the task, many of these data acquisition systems are custom made for a specific turbine and are therefore dedicated to that specific turbine. Such data acquisition systems cannot be moved from turbine to turbine and are hence not portable.

Also, many of these processor-controlled data acquisition systems include custom made terminals and software, thus requiring specialized training to operate the data acquisition equipment. Such specialized training is in and of itself costly. When coupled with the inability of the processor to be used for other tasks (meaning the training cannot be applied to other tasks), the cost of the training reduces the benefit of the system, further reducing the return on the system investment.

Each of the above described systems incur additional difficulties coupling to the control center of the turbine in a manner to prevent the turbine control system from sensing ground faults. Sensing of ground faults can cause turbine alarms ranging from warning buzzers to automatic shutdown of the turbine. Since turbine "down time" is expensive, it is desirable to prevent the turbine from sensing ground faults.

It is, therefore, desirable to provide a system for monitoring the operating status of a turbine and providing output data in a form which is easily interpreted by a maintenance staff member. It is, also, desirable to provide such a data acquisition system which can be readily and quickly coupled to the turbine and initialized for operation. It is also desirable to provide a data acquisition system which can be used in conjunction with standard computer apparatus such that the computer apparatus can record and process the received data before or after performance of other non-data acquisition-related tasks.

SUMMARY OF THE INVENTION

It is, therefore, an object of the present invention to provide a system for monitoring the operating status of a turbine and providing output data in a form which is easily interpreted by a maintenance staff member.

It is also an object of the present invention to provide such a data acquisition system which is portable and can be readily coupled to the turbine and initialized for operation.

It is further an object of the present invention to provide a data acquisition system which can be used in conjunction with a standard personal computer system such that the personal computer can record and process the received data in addition to performing other non-data acquisition related tasks.

To meet the above-stated objects, novel apparatus for monitoring the operating conditions of a turbine is provided. The monitoring apparatus comprises a cable adapted to be coupled to the turbine for receiving operation signals indicative of the operating status of the turbine. An interface device is adapted to be coupled to the cable for receiving and scaling the operation signals such that they vary within a predetermined voltage range. The interface device includes an input/output (I/O) terminal. A data processing device is adapted to be coupled to the I/O terminal for providing control signals and a regulated voltage thereto and for receiving the scaled operation signals therefrom. The processing means are adapted to process the received scaled operation signals to provide user data indicating the operating conditions of the turbine. The processing means include memory for storing the user data.

BRIEF DESCRIPTION OF THE DRAWINGS

Subject matter which is regarded to be invention is particularly pointed out and distinctly claimed in the numbered paragraphs appended hereto. The invention, however, both as to organization and method of practice, may best be understood from a reading of the following detailed description taken in conjunction with the drawings in which:

DETAILED DESCRIPTION OF THE INVENTION

Figure 1:
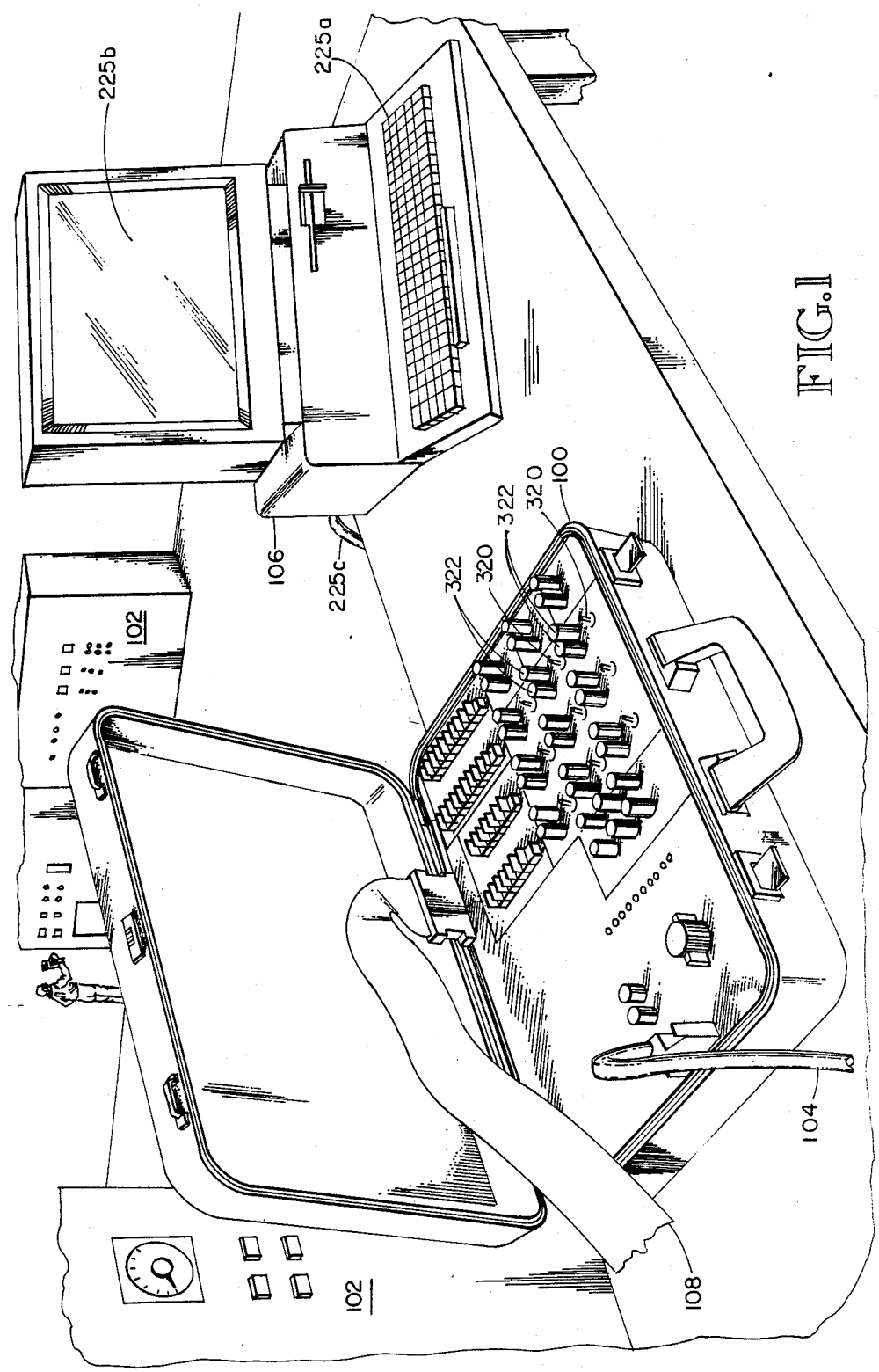
FIG. 1 is a perspective view of the apparatus which comprises the subject invention.

As mentioned above, the present invention is directed toward apparatus and method for monitoring the operating status of electronically controlled gas turbines. The inventive apparatus is shown generally to include interface device 100 of FIG. 1. Interface device 100 is coupled to a turbine control center 102 via a cable 104. The monitoring device is adapted to receive operating signals from the turbine control center, which signals are indicative of the operating status of the turbine. Monitoring device 100 is further adapted to scale the received operating signals such that they are suitable for use by a conventional data processing device 106. Data processing device 106 is adapted to be coupled to monitoring device 100 via a cable 108.

The present invention is particularly suitable for use with Mark I and Mark II gas turbine control systems manufactured by the General Electric Company. However, it should be appreciated by those skilled in the art that the monitoring device which is the subject of the present invention may be used with a variety of turbines produced by various manufacturers. Data processing device 106 may comprise any conventional data processor for receiving binary data and performing various data processing tasks thereon. Particularly, data processing device 106 may comprise a personal computer (commonly known as a PC).

Figure 2:
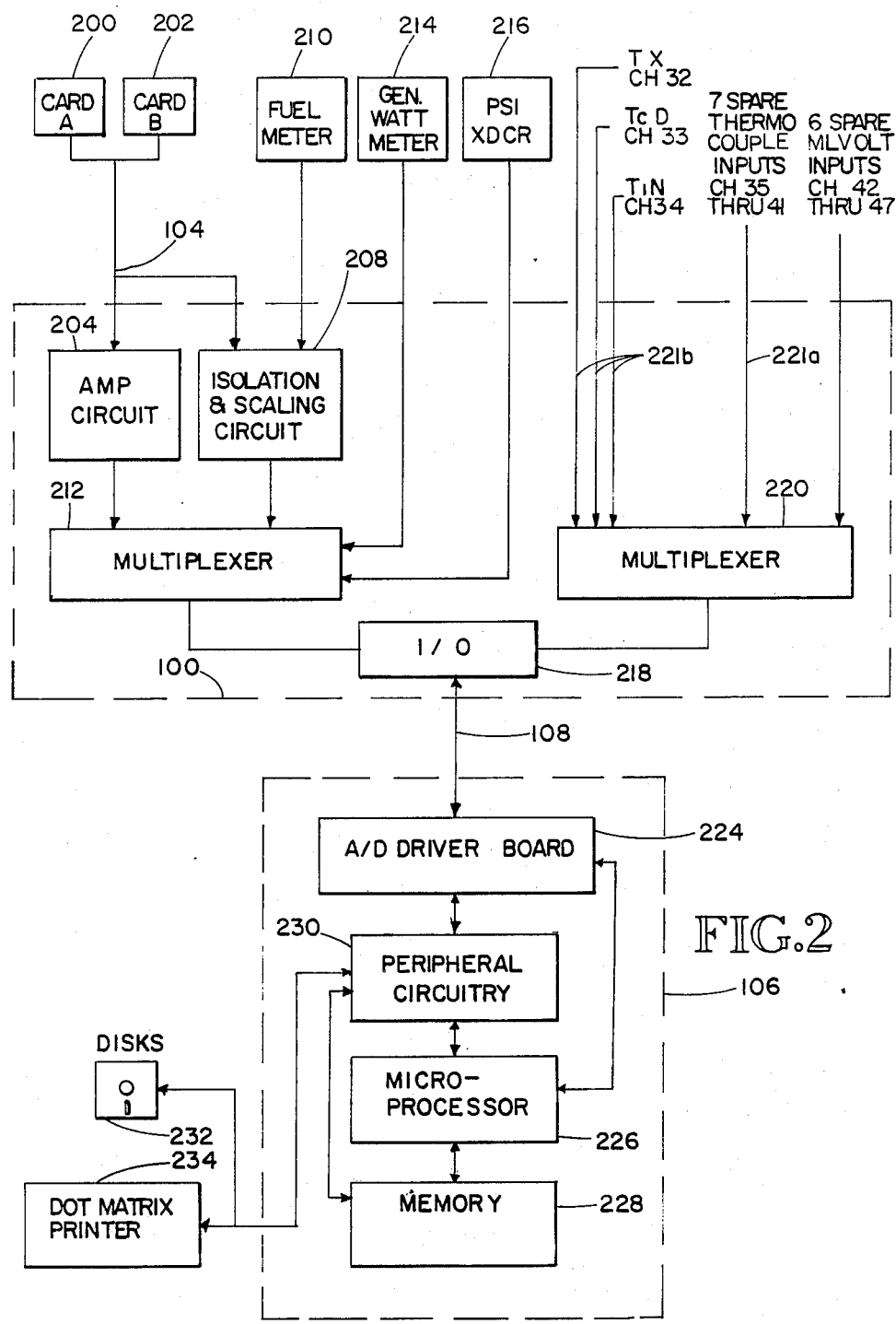
FIG. 2 is an illustrative block diagram of the interface circuit which comprises the subject invention.

Referring to FIG. 2, an illustrative block diagram of interface device 100 is provided. Interface device 100 is generally adapted to be coupled to the turbine control center 102 via cable 104 and terminal interface card 200 and 202. In the presently preferred embodiment, terminal interface cards 200 and 202 comprise General Electric Speedtronic card extenders sold under General Electric part numbers IC3606DEXB1A, which card extenders are particularly suited for coupling with the aforementioned General Electric speedtronic panel. Interface cards 200 and 202 comprise custom connectors which are adapted to be plugged into the Speedtronic panel to thereby receive a plurality of operating signals from turbine control center 102. Each operating signal is indicative of the status of a respective turbine parameter. It will be appreciated by those skilled in the art that if the present invention is to be used for monitoring turbines with control panels other than the aforementioned Speedtronic panels other interface cards may be readily interchanged for interface cards 200 and 202.

A particular advantage to using Speedtronic interface cards with the Mark I or Mark II control panels is the relative ease with which these cards can be coupled to the turbine for receiving operating signals therefrom. When used as a portion of the interface apparatus which is the subject of the present invention, Speedtronic cards 200 and 202 allow for coupling to the turbine during operation, thus eliminating the need for terminating operation of the turbine and thereby reducing costly turbine downtime.

Cards 200 and 202 are coupled to a plurality of amplifier circuits 204, via cable 104 (as also shown in FIG. 1), for providing selected ones of the operating signals to amplifier circuits 204. As will be explained more fully by reference to the schematic diagram of FIG. 4, amplifier circuits 204 are each adapted to receive vibration pick-up signals, indicative of the mechanical vibration of the turbine, and to amplify, rectify and scale the vibration signals before they are provided to processing device 106.

Cards 200 and 202 are also adapted to provide selective ones of the operating signals to an isolation and scaling circuit 208. Isolation and scaling circuit 208 is also shown to receive an operating signal from a fuel meter transducer 210, which signal is indicative of the gas (or other) fuel being consumed by the turbine. Transducer 210 may be coupled to the turbine in a variety of ways.

The operation of isolation and scaling circuit 208 will be described more fully herein by reference to the schematic diagram of FIG. 3. Generally, isolation and scaling circuit 208 is provided for scaling the received operating signals such that they vary within a predetermined voltage range. In the preferred embodiment the received operating signals are scaled by isolation and scaling circuit 208 to vary within a range between $-5$ volts and $+5$ volts. It will be apparent to those skilled in the art, however, that a variety of ranges may be chosen limited only by the choice of other circuitry to be described herein.

Isolation and scaling circuit 208, as well as amplifier circuits 204, is adapted to provide scaled operating signals to a multiplexer 212. Multiplexer 212 comprises conventional circuitry for multiplexing a plurality (sixteen in the preferred embodiment) of input signals to a single signal output in response to a digital input control signal received from terminal 218. Multiplexer 212 is further of the type which is adapted to receive analog signal inputs and to provide an analog signal output wherein the output signal is amplified by a predetermined gain. In the preferred embodiment, multiplexer 212 is adapted to provide a gain of unity ($G=1$) to the scaled operating signals received as its input. Since each input to multiplexer 212 from amplifier circuits 204 and isolation and scaling circuits 208 is in the predetermined voltage range of $-5$ volts to $+5$ volts, the output of multiplexer 212 will likewise fall within this range.

Multiplexer 212 is further adapted to receive operating signals from transducers 214 and 216. Transducer 214 provides a data signal indicative of the amount of electrical energy being produced by the turbine. Transducer 216 provides an operating signal indicative of the air pressure of air leaving the turbine compressor. Like transducer 210, transducers 214 and 216 may be coupled to the turbine in a variety of methods well known in the art.

As mentioned above, multiplexer 212 is coupled to provide its output to an input/output (I/O) terminal 218. Terminal 218 comprises a conventional apparatus for terminating signals sent to and from a computer or other data processing device. I/O terminal 218 is adapted to receive multiplexer control signals from data processing device 106, which control signals instruct multiplexer 212 which signal to enable to the data processing device. I/O terminal 218 is further adapted to receive a regulated voltage input from processing device 106 via cable 108 thereby providing a regulated voltage source for interface device 100.

I/O terminal 218 is also adapted to receive analog input signals from a multiplexer 220. Like multiplexer 212, multiplexer 220 comprises conventional circuitry for receiving a plurality of analog signal inputs and providing a single analog signal output in response to a control signal received from data processing device 106 via I/O terminal 218. In the present embodiment, multiplexer 220 is adapted to have a gain of fifty, i.e., $G=50$.

Multiplexer 220 is adapted to be coupled to a plurality of input thermocouples 221a to allow for monitoring a variety of auxiliary signals. Additionally, multiplexer 220 is adapted to be coupled to three temperature thermocouples 221b for measuring the temperature of: turbine exhaust (TX); air from the turbine's compressor (TcD); and air taken in by the turbine (Tin). It will be appreciated by those skilled in the art that the output of these thermocouples is typically less than one tenth of a volt, accordingly, the output of multiplexer 220, like the output of multiplexer 212, will be in the predetermined voltage range of −5 volts to +5 volts.

I/O terminal 218 is adapted to provide its output to data processing device 106 via cable 108. As mentioned above, data processing device 106 may comprise a variety of conventional data processors which are readily available. As an example, personal computers made by the following manufacturers may be used in the present invention: IBM, AT&T, Zenith, Compaq, Texas Instruments, Hewlett Packard, Tandy Corporation and Olivetti. Other data processors may be used, without departing from the true scope of the invention, with only slight modification to the monitoring apparatus as described below.

The operating signals provided by I/O terminal 218 are received by an analog-to-digital (A/D) driver board 224 of data processing device 106. A/D driver board 224 is provided for interfacing the multitude of operating signals with the data processing device 106. Additionally, A/D board 224 converts its analog input to digital output suitable for use by data processing device 106. Particularly, A/D board 224 responds to control signals received from a microprocessor 226 for controlling multiplexers 212 and 220 such that the proper operating signals are forwarded to the microprocessor. A/D board 224, as well as multiplexers 212 and 220, I/O 218 and cable 108, are each provide by Metrabyte Corporation in a single package known as a DAS-8 board. As is common in the personal computer arts, A/D driver board 224 of the DAS-8 package is most conveniently coupled to data processing device 106 by physically mounting the driver board in a location provided for user added apparatus.

A particular advantage of the DAS-8 package is that it allows monitoring of up to eight individual channels of analog inputs at a maximum single channel scan rate of 4,000 samples per second. That is, A/D driver board 224 is capable of communicating with eight multiplexers, each multiplexer being capable of multiplexing sixteen signals. A further advantage is that A/D board 224 may be used in conjunction with a wide variety of personal computers as mentioned above. A/D board 224 may be used in conjunction with still more personal computers with only minor modifications to the driver board.

Data processing device 106 is comprised of conventional circuitry for performing data processing operations. As an example, data processing device 106 would typically comprise: a keyboard terminal 225a (see FIG. 1) or other means for interfacing a user with the data processor; a cathode ray tube 225b or other similar device for displaying data to the user; microprocessor 226 for controlling the operations of the data processing device and performing data processing functions on its input signals, memory 228 for storing both data and operating programs which control the operation of the data processing device; means for receiving power input such as, for example, a power cord 225c suitable for receiving standard 120 volts 60 Hertz A/C current; and, other timing and peripheral circuitry 230 necessary for operating a personal computer or other data processing device. Each of the foregoing components of data processing device 106 are well known in the art.

In the preferred embodiment, data processing device 106 is provided with software which enables it to communicate with interface device 100. Particularly, the present invention utilizes a novel combination of LAB TECH NOTEBOOK software sold by Laboratory Technologies Corporation and LOTUS 1-2-3 software sold by Lotus Development Corporation. Generally, LAB TECH NOTEBOOK allows the user to determine what inputs of multiplexers 212 and 220 are to be accessed, the software scaling to be used, the sampling rate, and the use of analog triggers. Further, the LAB TECH NOTEBOOK software allows the user to determine how data is to be displayed on the computer screen, e.g. graphs, bars, digital, etc. Using LAB TECH NOTEBOOK, the user can also control saving of the data.

The LAB TECH NOTEBOOK software has been particularly adapted for use with the subject invention. Accordingly, the variety of parameters which are available through LAB TECH NOTEBOOK have been initially set such that a user does not have to be familiar with the software to use the data acquisition program. The LAB TECH NOTEBOOK software has been arranged in a simple menu-driven fashion to allow a user to easily set the various parameters necessary for accurate operation of the apparatus for monitoring the turbine.

The LOTUS software has been provided to analyze data, also in a menu-driven fashion. LOTUS software allows for graphic display, printed reports and archiving of the acquired data. Using the combination of LAB TECH NOTEBOOK and LOTUS, a number of turbine parameters may be jointly processed to provide a real time single derivative turbine status output, e.g., fuel efficiency as a function of fuel intake and power output. Further, many iterations of a single calculation can be performed to provide detailed processing of a single parameter.

Using the adapted LAB TECH NOTEBOOK software monitoring device 100 can display data in up to 15 windows in real time. A user can also monitor a sequence of events by constantly polling predetermined inputs until a selected event occurs. The number and frequency of samples before and after the event can be input by the user. As such, a number of samples which led up to an event as well as the number of samples subsequent to an event can be saved by the data processor. Data thus acquired, can be replayed just as though it were being acquired, making the monitoring device a teaching tool as well as a turbine maintenance tool.

A further advantage of using conventional personal computers for data processing device 106 in conjunction with the interface device 100 in the present invention is the ability to couple the data processing device 106 to conventional peripheral devices for storing data, displaying data and/or further processing of data. As shown in FIG. 2, data processing device 106 is coupled to conventional disc memory 232 for recording data and is further couple to a conventional dot matrix printer 234 for displaying data.

Figure 3:
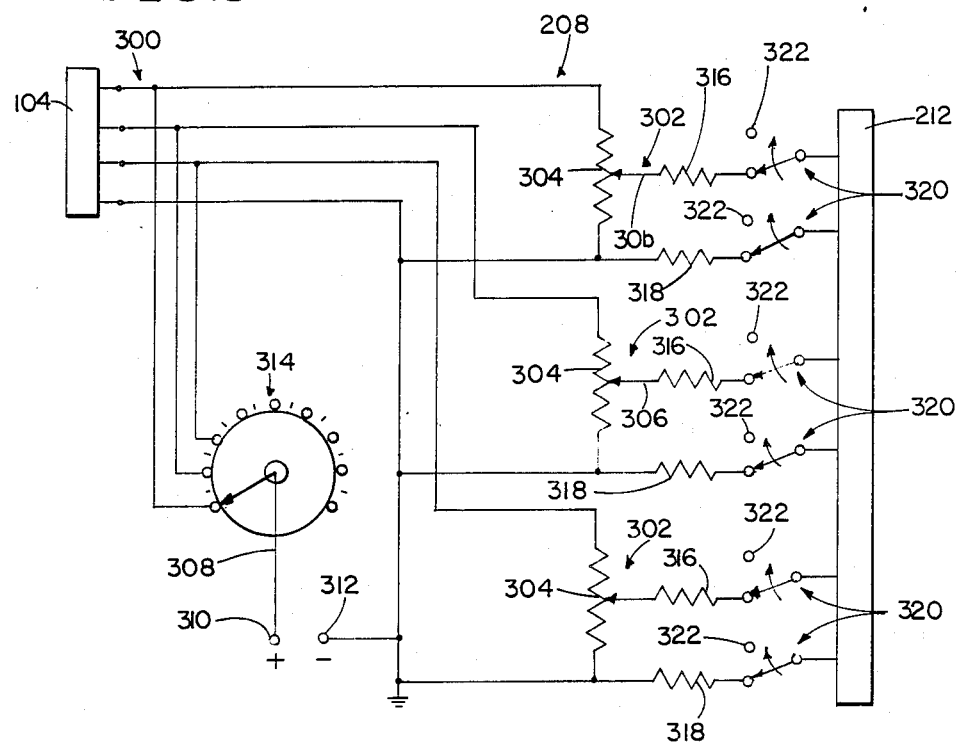
FIG. 3 is a schematic diagram of a portion of the interface circuit which comprises the present invention.

Referring to FIG. 3, a more detailed schematic diagram of isolation and scaling circuit 208 is provided. Therein, cable 104 is shown to provide a plurality of input signals one on each of signal lines 300 to the scaling circuit. Isolation and scaling circuit 208 comprises a plurality (ten in the presently preferred embodiment) of identical scaling circuits 302 (three of which are shown in FIG. 3), each adapted to provide a predetermined scaling factor to a respective operating signal input. Each scaling circuit 302 comprises a variable resistor 304 which has a first terminal coupled to receive a predetermined one of the operating signal lines 300 from cable 104. Each variable resistor 304 also has a second terminal which is common to the second terminal of each other of the resistors 304. Variable resistor 304 further includes a center tap 306 which may be adjusted by the user to provide the desired scaling factor.

Isolation and scaling circuit 208 also includes a multi-position rotary switch 308. Multi-position switch 308 has a common input terminal which is coupled to a first signal connector 310. A second signal connector 312 is provided and coupled to the common second terminal of each of the variable resistors 304 of the scaling circuit. Multi-position switch 308 includes a plurality of selectable terminals 314 each coupled to one of the input signal lines 300 to connect a selected one of the input signal lines through the multi-position switch 308 to first signal connector 310.

To provide the desired scaling factors to isolation and scaling circuit 208, cable 104 is first disconnected from input signal lines 300. A known voltage is then provided to signal connectors 310 and 312. Multi-position switch 308 can then be used to couple the known voltage sequentially to each of the individual scaling circuits. As each scaling circuit 302 is coupled to the known voltage, variable resistor 304 for the scaling circuit can be adjusted until a desired portion of the known voltage is received at the scaling circuit output. It will be appreciated by those skilled in the art that when the system is coupled to data processing device 106, the portion of the known voltage which is selected can be displayed to the user by the data processing device via multiplexer 212, I/O terminal 218 and A/D driver board 224 as determined by the LAB TECH NOTEBOOK setup files.

Isolation and scaling circuit 208 also includes a novel means for isolating the turbine from the interface device 100. Typically, turbines detect ground faults by monitoring the current flow in the ground or common terminal. To detect unusually high current flow, indicative of a ground fault, turbines include elaborate systems for monitoring ground current. Coupling a personal computer to the ground of the turbine could cause undesirable current flow and result in a ground fault. As mentioned above, ground fault alarms can range from warning signals to costly turbine "down time". Therefore, it is necessary to isolate the data processor ground from the turbine ground. This is advantageously performed by interface device 100.

In order to provide the desired isolation a pair of high value resistors 316 and 318 are provided for each scaling circuit 302. Resistor 316 of each scaling circuit 302 is coupled to center tap 306 of variable resistor 304 and resistor 318 is coupled to the common terminal of variable resistor 304. In the preferred embodiment, resistors 318 and 316 each comprise a one megaohm resistor which is of a high value relative to the output impedance of the turbine control center. This method of signal isolation produces minimum current flow from the turbine control center to the data processor, thereby to provide adequate protection from ground faults at minimum cost.

Another advantage of the present invention resides in its use of a switch 320 associated with each scaling circuit 302. Switch 320 comprises a double-pole, double-throw switch for selectively coupling either the resistors 316 and 318 for each scaling circuit 302 with the scaled operating signal and its respective common terminal of the scaling circuit to multiplexer 212 or, alternatively, for coupling a pair of jacks 322 to the multiplexer. Each pair of jacks 322 is available to a user to allow the user to substitute input signals for those signals usually received from cable 104.

Figure 4:
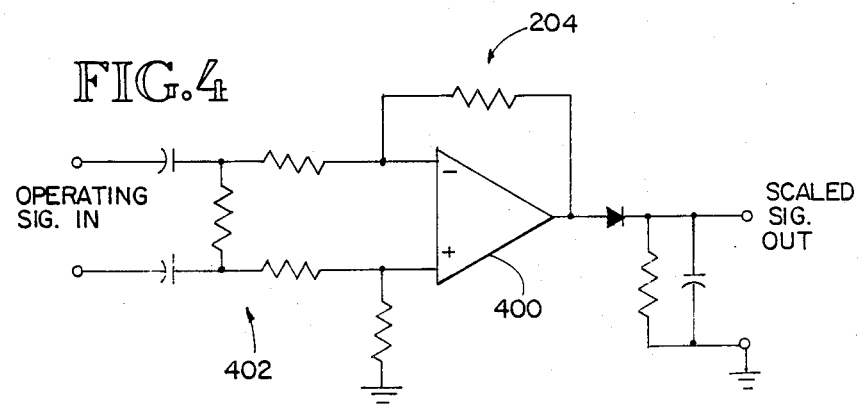
FIG. 4 is a schematic diagram of another portion of the interface circuit which comprises the present invention.

Referring to FIG. 4, a more detailed schematic diagram of an amplifier circuit 204 (FIG. 2) is provided. As mentioned above, amplifier circuits 204 are provided for receiving vibration signals which are indicative of the mechanical vibration of the turbine. Amplifier circuits 204 are adapted to rectify and amplify the received vibration signal and provide a scaled vibration signal output to multiplexer 212. More particularly, amplifier circuits 204 are each adapted to receive a A/C signal input and to provide a substantially D.C. signal output (within the predetermined range of −5 volts to +5 volts) indicative of the envelope of the input signal and consequently indicative of the relative magnitude of turbine vibration. It will be appreciated by those skilled in the art that while only one amplifier circuit is shown in FIG. 4, each of the plurality of amplifier circuits 204 are each constructed the same as will be described by reference to the circuit of FIG. 4.

The amplifier circuit of FIG. 4 comprises a feedback amplifier 400 coupled to receive its input via a capacitor-resistor network 402. Amplifier 400 is comprised of a conventional operational amplifier. The operational amplifier receives its source (or power) input (not shown) from the regulated voltage supplied to terminal 218 by data processing device 106. In this manner, the interface device need not contain its own power source. In the preferred embodiment, amplifier circuit 204 is adapted to provide a gain of approximately ten to the vibration signal input. It will be appreciated, however, by those skilled in the art that the gain and response of amplifier circuit 204 may be adjusted to be compatible with signals received from various turbine control panels.

While only several presently preferred embodiments have been described in detail herein, many modifications and variations thereof will readily be apparent to those skilled in the art. It is the intent of the inventors, therefore, by the appended claims, to embody all such modifications and variations which fall within the true scope and spirit of the invention.

We claim:

1. Apparatus for monitoring operating conditions of turbines wherein the turbine includes an electronic control panel which provides a plurality of operation signals each signal being indicative of the status of a turbine parameter, said apparatus comprising:
   a cable selectively coupleable to the turbine control panel during a test period for receiving the operation signals therefrom;
   interface means selectively coupleable to said cable during a test period for receiving the operation signals, said interface means being adapted to scale the operation signals such that they vary within a predetermined voltage range, said interface means including an input/output (I/O) terminal; and data processing means selectively coupleable to said I/O terminal during a test period for receiving the scaled operation signals, said processing means being adapted to process the received scaled operation signals to provide user data indicating the operation conditions of the gas turbine, said processing means including memory for storing the user data.

2. Apparatus as recited in claim 1 wherein said processing means, comprises:

a multi-purpose personal computer (PC) including a data processor, input terminal, a display and memory, said PC being adapted to perform the data processing upon the scaled operation signals to provide the user data and to store the user data in said memory; and card means for interfacing said computer means with said interface means, said card means being responsive to said data processor for providing selected ones of said operating signals to said PC.

3. Apparatus as recited in claim 1 wherein said interface means comprises:

an input terminal adapted to be coupled to said cable during a test period, said input terminal including a first conductor and a plurality of second conductors, said first conductor for receiving a control panel ground signal and said plurality of second conductors each for receiving a respective operating signal; and a plurality of voltage divider means for scaling said operating signals, each said voltage divider means being coupled to said first conductor and a respective one of said second conductors to receive a respective operating signal, each said voltage divider means being adjustable by a user to divide the voltage of the received operating signal by a user selectable factor to provide the scaled operating signal output.

4. Apparatus as recited in claim 3 wherein said voltage divider means further comprises:

a variable resistor including first, second and third terminals, said first terminal of said variable resistor being coupled to said first conductor, said second terminal of said variable resistor being coupled to its respective one of said second conductors and said third terminal being adjustable to vary the resistance between said first and third terminals such that the signal received by said first and second terminal can be divided by a user selectable factor, said first and third terminals of said variable resistor comprising the output of said voltage divider means.

5. Apparatus as recited in claim 4 wherein said interface means further comprises:

a multi-position switch for coupling the reference terminal of a known voltage of known magnitude to said first conductor and for coupling the remaining terminal of the known voltage separately to a selected one of said second conductors such that said known signal may be separately coupled to each said voltage divider means and said voltage divider means can be adjusted to divide its respective operating signal by a user selectable factor.

6. Apparatus as recited in claim 5 wherein said interface means further comprises:

isolation means for isolating said data processing means from the turbine control panel such that coupling said data processing means to the turbine control panel via said interface means does not cause ground faults and consequent turbine shut down.

7. Apparatus as recited in claim 6 wherein said isolation means comprises:

a plurality of first and second isolation resistors each coupled respectively to said first and third terminals of a respective voltage divider means, each said isolation resistor having a high value relative to the output impedance of the turbine control panel, each said first isolation resistor being coupled intermediate its respective first terminal and said data processing means and each said second isolation resistor being coupled intermediate its respective third terminal and said data processing means.

8. Apparatus as recited in claim 7 wherein said interface means further comprises:

a plurality of first and second signal connectors, each first and second connector being associated with a respective one of said first and second isolation resistors; and a plurality of switches, each switch having two output terminals and being associated with a respective one of said voltage divider means, each said switch having first and second positions wherein said first position couples the output of said voltage divider means to said switch output terminals and wherein the second position couples a respective one of said signal connector pairs to the output of said switch.

* * * * *